Dec. 4, 1945.  P. SPURLINO ET AL  2,390,396
ACCOUNTING MACHINE
Original Filed Oct. 2, 1940  2 Sheets-Sheet 1

Inventors
PASCAL SPURLINO AND
KONRAD RAUCH
BY Earl Beust
THEIR Attorney

Dec. 4, 1945.  P. SPURLINO ET AL  2,390,396
ACCOUNTING MACHINE
Original Filed Oct. 2, 1940   2 Sheets-Sheet 2
FIG. 4
| PROOF DEPARTMENT BALANCE SHEET | | | | |
|---|---|---|---|---|
| MACH. NO. DEPT. NO. | | AMOUNT | DESCRIPTION | NO. ITEMS |
| 12 | 1 | 13,925.63 * | CLEARING HOUSE BANK NO. 1 | |
| 12 | 2 | 15,717.27 * | CLEARING HOUSE BANK NO. 2 | |
| 12 | 3 | 1,618.50 * | CLEARING HOUSE BANK NO. 3 | |
| 12 | 4 | 1,725.97 * | CLEARING HOUSE BANK NO. 4 | |
| 12 | 5 | 12,468.10 * | TRANSIT LETTER NO. 1 | |
FIG. 5
| | | | |
|---|---|---|---|
| 1487 | | 7 | 73.10 |
| 1487 | | 6½ | 38.14 |
| 1487 | 12 | | 111.24-20 |
| 1486 | | 2 | 18.25 |
| 1486 | | 9 | 6.50 |
| 1486 | | 16 | 10.00 |
| 1486 | | 4 | 225.00 |
| 1486 | | 13 | 88.14 |
| 1486 | 12 | | 347.89-20 |
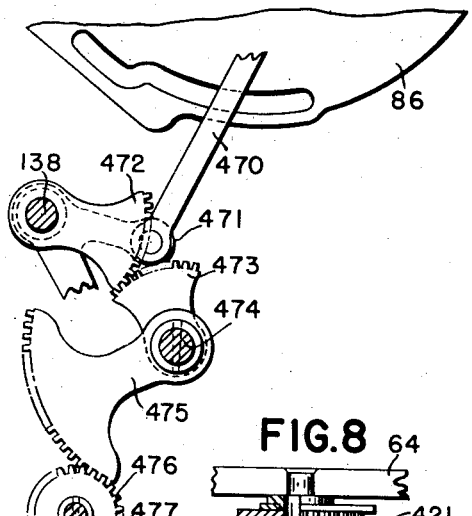
FIG. 6
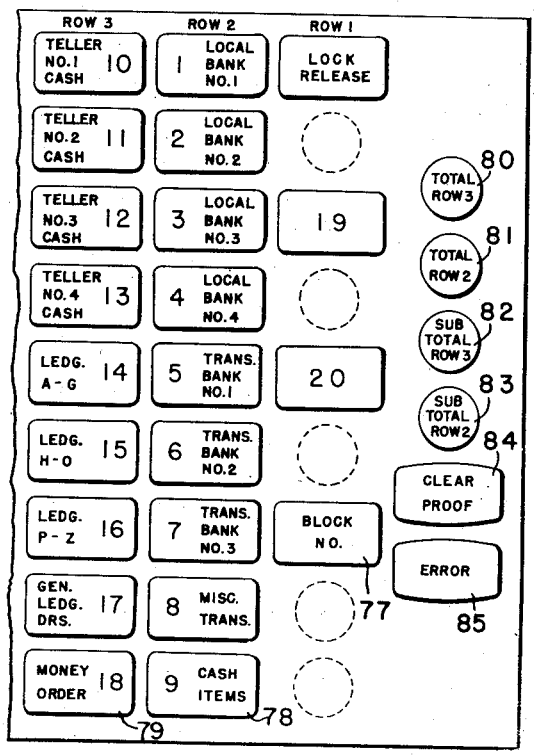
FIG. 7
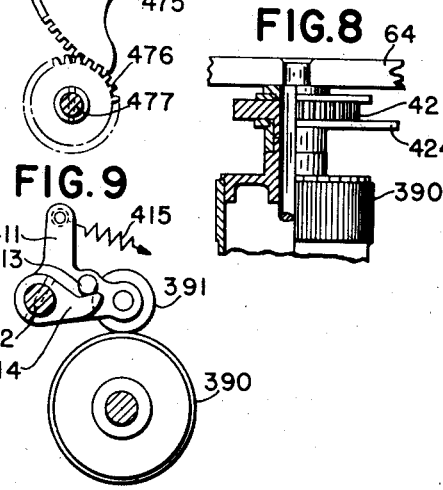
FIG. 8
FIG. 9
Inventors
PASCAL SPURLINO AND
KONRAD RAUCH
BY *Earl Beust*
THEIR Attorney Patented Dec. 4, 1945

2,390,396

UNITED STATES PATENT OFFICE 2,390,396

ACCOUNTING MACHINE

Pascal Spurlino and Konrad Rauch, Dayton, Ohio, assignors to The National Cash Register Company, Dayton, Ohio, a corporation of Maryland Original application October 2, 1940, Serial No. 359,374. Divided and this application September 13, 1943, Serial No. 502,128

7 Claims. (Cl. 235—3)

This invention relates to accounting machines and similar business machines and is directed particularly to the recording means of such types of machines, and is a division of application for United States Letters Patent of Pascal Spurlino and Konrad Rauch, Serial No. 359,374, filed October 2, 1940, which application issued into Patent No. 2,361,662 on October 31, 1944.

The invention is embodied in machines of the general type shown in the following United States Letters Patent, and reference may be had to them for a complete showing and description of standard mechanisms not fully disclosed herein: United States Patents Nos. 1,619,796, 1,747,397, and 1,761,542, issued March 1, 1927, February 18, 1930, and June 3, 1930, respectively, to Bernis M. Shipley; No. 2,175,346, issued October 10, 1939, to Maximilian M. Goldberg; No. 2,141,332, issued December 27, 1938, to Charles H. Arnold; and No. 1,693,279, issued November 27, 1928, to Walter J. Kreider.

The machine embodying the present invention, and as now constructed, is well adapted for use by banks, and especially in the proof departments thereof, where the various items are listed and distributed, and deposits checked for a proof balance at the end of each day.

Each bank, in its proof department, keeps an accurate record of each transaction handled by the bank, which transactions generally come from incoming mail, from out-of-town or transit banks, incoming clearings from local banks, and receiving and paying items handled by the tellers of the bank.

Many banks require that their list of checks or items paid by another bank be accompanied by a printed list of checks paid by a bank when the checks are sent back to the bank on which they are drawn.

Therefore, for use in connection with these and other requirements of the bank, a machine which prints individual lists or groups of items, a master list of all items, identification data on deposit slips or on a check as desired, a departmental or group total slip, and totals of the distributed items is essential, as it not only is a great time saver for the employees of the bank but also provides accurate machine-printed results immediately at the close of the day's business.

For the purpose of illustrating one form of the present invention, the machine shown herein is constructed to perform the functions stated above. However, it is not intended to limit the invention to this one form, as other forms for fulfilling other business systems may be used without in any way departing from the invention.

It is, therefore, one object of this invention to provide an accounting machine with means for distributing items into a plurality of classifications and also provide means for recording all items of such classifications.

Another object is to provide a master tape or record strip to receive printed impressions of all items listed on individual tapes, and on which are also listed all other classifications of items which, due to the particular system of the bank, are not listed on any of the individual tapes.

Another object is to provide a variable feed for said master tape, controlled by the type of operation on the machine.

A more specific object is to provide a single means for feeding said master tape or record strip and a plurality of actuating means for the single feeding means with a novel controlling mechanism for determining which of the actuating means is to actuate the feeding means.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In said drawings:

Fig. 4 shows a portion of a master tape and how it is used on the proof of balance sheet, a portion of which is also shown.

Fig. 5 shows a portion of a master tape or audit strip.

Fig. 6 is a fragmentary side view of the total control plate and the connection therefrom to the master tape feed control.

Fig. 7 is a diagrammatic view of a portion of the keyboard of the machine.

Fig. 8 is a detail view, partly in section, showing the construction of a portion of the feed means for the master tape.

Fig. 9 is a detail view of the master tape tension roll.

GENERAL DESCRIPTION

Figures 1, 2, 3:
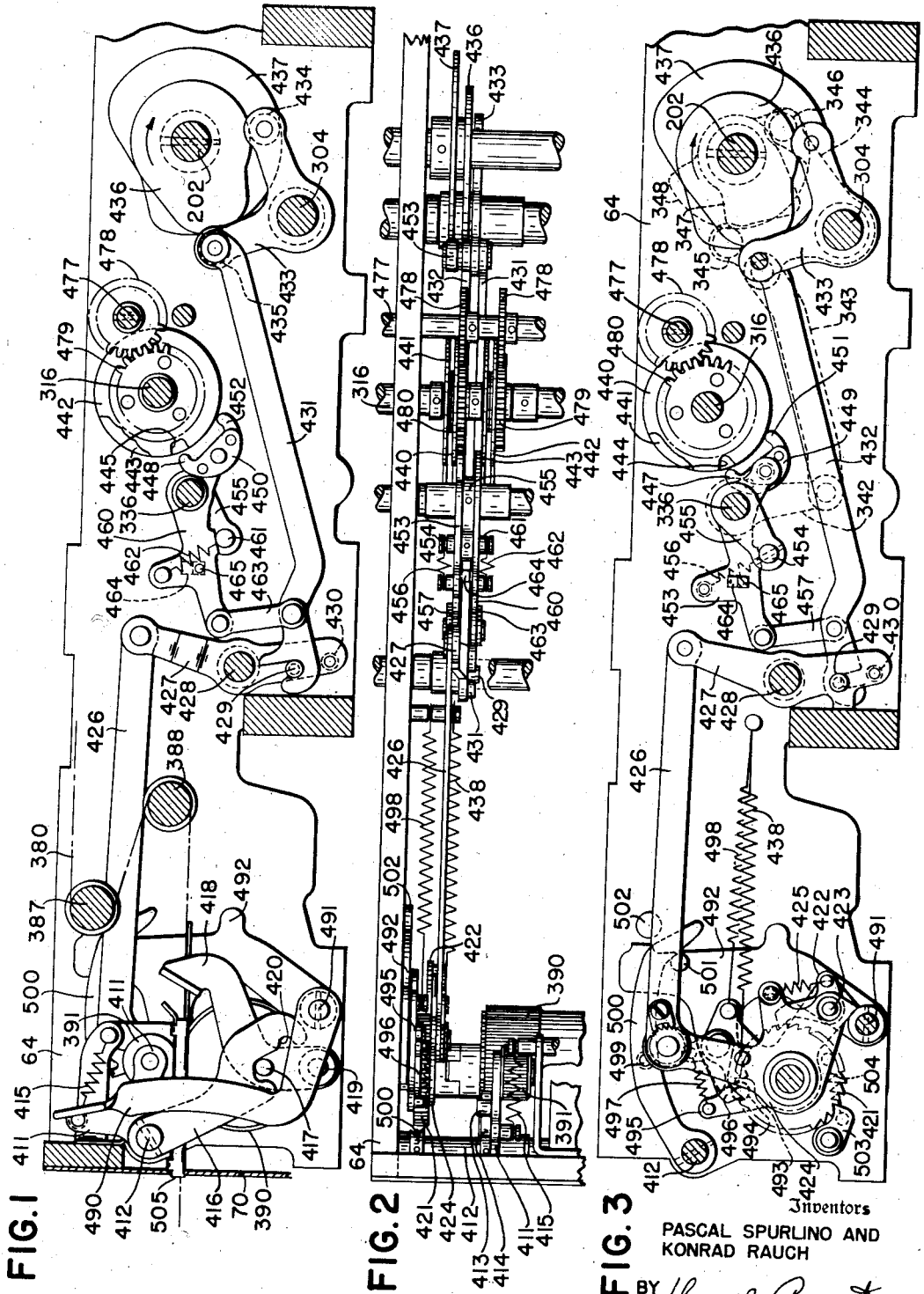
Fig. 1 shows the means for giving the master tape a long feed when totals are printed by the machine, the actuating means therefor, a portion of the control means for the actuating means, and also shows a manual feed and the tension release lever for the master tape.
Fig. 2 is a fragmentary plan view, showing a part of the master tape feeding mechanism, actuating means therefor, and the control for said actuating means.
Fig. 3 shows the master tape short feed means and a portion of the control means for the same.

Described in general terms, the machine embodying the instant invention is of the type generally disclosed in the above-mentioned Shipley and Goldberg patents. These patents disclose a plurality of totalizers into which may be distributed various amounts, according to the system for which the machine is built. In the present instance, the totalizers are adapted to receive the many and various items constituting individual transactions that are handled in the ordinary banking business. These patents disclose what are known in the art as "add and subtract" totalizers or "crossfooters," from which balances may be printed at any time desired.

In the present machine, there has been a definite change in the position of the master tape or audit strip. In the patents above mentioned, the audit strip is usually in the front of the machine, whereas in the present machine this master tape or audit strip is at the right end of the machine and located under the control bank of keys. There is provided in the machine of the present invention an internal gear driving mechanism, such as that disclosed in the above-mentioned Kreider patent which is for the purpose of simultaneously setting up, on groups of printing devices, amounts and data under control of the keys, so that printing can be readily accomplished on a slip or check, or one of the individual listing tapes, such as disclosed in the parent application.

By means of this same type of mechanism, shown and described in the Kreider patent, the type wheels (not shown herein), which are associated with the master tape, are simultaneously set up at the right-hand side of the machine for the purpose of printing on the master tape or audit strip all of the items which are entered in the machine. These same type wheels are also utilized to print totals on the master tape.

The machine keyboard is arranged for taking care of all business in connection with the bank whereby all transactions handled by the bank may be listed in this machine and a printed record made of each of the transactions on the master tape. The machine is, therefore, provided with the usual banks of amount keys (not shown herein) of sufficient capacity to take care of the ordinary business of any bank.

There are also three rows of what are known in the art as "control" keys, for the purpose of selecting various totalizers for the distribution of the transactions entered in the machine. There is also a row of total-taking control keys, which control the machine for the purpose of taking totals from the various totalizers at the close of any day when it is desired to clear out the machine to render it ready for business the following morning. These totals are printed on the master tape and are used in connection with a proof of balance sheet in a manner to be described hereinafter.

The master tape, as above mentioned, is adapted to have printed thereon items and totals. When printing items, it is highly desirable that the items be printed a certain distance apart, and, when printing totals, it is also highly desirable that the totals be printed farther apart than are the items. The reason for having the totals printed farther apart than the items is so that the master tape may be used in connection with the proof of balance sheet shown in Fig. 4, for comparing the totals with the "Clearing house bank #1," "Clearing house bank #2," etc.

The two feeding mechanisms—that is, the short feed and the long feed for the master tape—are controlled by a special control mechanism, which determines which of the actuating means for the feeding mechanism is to be put into operative relationship with the feeding means. These two separate actuating means for the common feeding means are controlled by the type of operation which the machine is to be put through. For example, when entering items, the amount keys are depressed and the total plate is in a normal or add position, and during these types of operations the master tape always receives a short feed. However, when taking totals from the machine, under control of the control keys, the total plate is differentially adjusted according to the control key which has been depressed, and under such adjustment the actuating means for the feed means of the master tape is controlled so that during such total taking operations the master tape will receive a longer feed than when entering items.

DETAILED DESCRIPTION

Keyboard

A part of the keyboard is diagrammatically shown in Fig. 7 and, as above stated, shows the three banks of control keys and the single bank of total control keys.

None of the amount keys which are shown in the parent application have been shown in the present divisional application.

There are three banks or rows of transaction keys 77, 78, and 79 (Fig. 7) shown in this divisional application. These keys 77, 78, and 79 are used for selecting totalizers on the various lines, and also the crossfooter, as shown in the parent application, for engagement with the actuators for distribution of amounts, as above mentioned. The selections of the various totalizers are not involved in the present divisional application, and therefore nothing further need be said in connection with them.

When a customer's deposit is to be entered and distributed by the machine, the total of the deposit is set up on the amount keys (not shown), and the key 20 in row 1 is depressed and the machine put through one operation, wherein the total of the deposit is entered in the crossfooter and also in a group totalizer.

A distribution of the various items making up the total of the deposit just entered is then made, the operator setting up the amount of each check and distributing these amounts in any of the proper totalizers related to the 18 transaction keys in rows 2 and 3. The row of keys at the extreme right in Fig. 7 is known as the "total control row," and this row has six keys, 80 to 85 inclusive. The first four keys, 80 to 83 inclusive, are used to control the machine for taking totals and sub-totals from the totalizers associated with the keys 78 and 79 in rows 2 and 3. The key 84 is used to clear the crossfooter, and the key 85 sub-totals the crossfooter to print the amount of an error on the master tape and shows whether or not this error is a plus error or a minus error.

The present machine has a total control plate (Fig. 6) for controlling the engaging and disengaging movements of the three totalizer lines in adding, non-adding, subtracting, total-printing, and sub-total printing operations. The positioning of the total control plate 86 is controlled by the total keys 80 to 85 inclusive.

*Master Tape*

A master tape 380, shown in Figs. 4 and 5, is adapted to be printed upon by the machine shown in this divisional application. In previous machines of this general type, the master tape or audit strip was usually fed across the front of the machine. However, in the present invention the master tape is fed from the back to the front of the machine, and is located at the extreme right-hand side of the machine.

This master tape 380 is fed from a supply roll (not shown) over a series of guide rollers (also not shown) until it reaches a roller 387, around which it is passed, and then around a roller 388 supported by the frame 64, and fed between a feed roller 390 and a pair of tension rollers 391 (Figs. 1, 2, and 9) and out through an opening 595 in the machine cabinet 70.

*Master tape or audit strip feeding mechanism*

The master tape or audit strip 380 is moved from a reading position to a printing position and then, after printing has taken place thereon, is moved back to a reading position. However, the means for moving the master tape from reading position to printing position and back to reading position is not shown in this divisional application, as it forms no part of the feeding mechanism. However, during the movement of the master tape from the printing position to the reading position, it is fed either a long or a short feed, depending upon whether the operation of the machine is for the entering of items or for the taking of totals. The movement of the master tape from reading to printing position in no way affects or controls the feeding of the audit strip 380.

Referring particularly to Figs. 1 to 3, the parts are shown in their normal positions at the beginning of an item-entry or add operation of the machine.

Normally the mechanism is connected for a long feed, but during the first part of the add or item-entry operation the long feed actuating mechanism is disconnected and the short feed actuating mechanism is connected so that during item-entry operations a short feed is given to the master tape or audit strip 380. This long and short feed actuating mechanism is controlled by the position of the total control plate 86 in a manner to be hereinafter described.

The means for feeding the master tape or audit strip 380 will now be described. As above stated, the strip is passed between the knurled feed rolls 390 (Figs. 1, 8, and 9) and the tension rolls 391 (Figs. 1, 2, and 9).

The tension rolls 391 are carried on bell cranks 411 (Figs. 1 and 9) pivoted on a shaft 412 carried by the frames 64, and another frame (not shown) running parallel thereto. Each of the bell cranks 411 has a stud 413 held in contact with an arm 414 by a spring 415. These arms 414 are used to release the tension rolls 391 from the feed roller 390 when it is desired to draw a portion of the master tape 380 out of the machine by hand independently of the feeding mechanism. To release these tension rolls 391 there is secured to the shaft 412 an arm 416 cooperating with a stud 417 carried by an arm 418 pivoted on a stud 419. When it is desired to release the tension rolls 391 from the feed roll 390, the operator depresses the arm 418 (Fig. 1), moving it in a clockwise direction, whereupon the stud 417 cams the arm 416 and the shaft 412 counter-clockwise, thus moving the arms 414 likewise, and their engagement with the studs 413 raises the tension rolls 391 from the feed roll 390. The arm 416 has a retaining notch 420, into which the stud 417 fits when the arm 418 has been moved its maximum distance, thus retaining the tension rolls 391 fully disengaged from the roll 390.

Connected to the feed roll 390 by a mortise and tenon connection is a feed ratchet 421 (Figs. 2, 3, and 8), with which cooperates a feed pawl 422 pivoted at 423 on a lever 424 mounted on the hub of the ratchet 421. The pawl 422 is held in contact with the ratchet 421 by a spring 425. Adjustably pivoted to the upper end of the lever 424 is a link 426, which is also pivoted to a lever 427 (Figs. 1, 2, and 3) pivoted on a shaft 428 supported by the printer frames (only one of which, 64, is shown). By means to be hereinafter described, this lever 427 is rocked first counter-clockwise and then clockwise to its normal position. The counter-clockwise movement thereof rocks the lever 424, whereupon the pawl 422, through its cooperation with the ratchet 421, turns the feed roll 390 to feed the master tape or audit strip 380. A spring 438 assists in returning the lever 424 and associated parts to their normal positions.

As above stated, there are both a long feed and a short feed given to the audit strip 380, the short feed being during item-entering operations and the long feed being during total-taking operations.

The lever 427 carries two studs 429 and 430, adapted to be engaged by links 431 and 432, respectively, which links are both pivoted to a bell crank 433 loose on a shaft 304 supported by the printer frames. The bell crank 433 has two rollers, 434 and 435, cooperating with plate cams 436 and 437 secured to the printer drive shaft 202. This printer drive shaft 202 receives its motion from the main cam shaft of the machine, not shown in this application, but which is shown in the parent application, Serial No. 359,374. The drive from the main cam shaft of the machine to the printer drive shaft is such that the printer drive shaft 202 will receive one complete clockwise rotation during each adding operation and one complete rotation during the second cycle of a total-printing operation, which, as is well known in this art, consists of two cycles of operation. There is provided the usual clutch mechanism, not shown herein but shown and described in the above-mentioned Shipley Patent No. 1,619,796, to prevent any movement of the printer drive shaft 202 during the first cycle of any two-cycle total operation.

During adding operations of the machine, the cams 436 and 437, through the bell crank 433 and the link 432, which at that time, by means to be hereinafter described, is coupled with the stud 430 (and at the same time the link 431 is uncoupled from the stud 429), to cause the counter-clockwise and clockwise rocking of the lever 427 previously described, to feed the master tape or audit strip 380.

As above stated, during total-taking operations the shaft 202 is not operated during the first cycle of a total-taking operation but is operated during the second cycle thereof. During this second cycle, the link 431 is coupled to the stud 429, as shown in Fig. 1, whereupon the lever 427 is rocked counter-clockwise and then clockwise as previously described, only this movement is of a greater extent than that given to the lever 427 during adding operations, and consequently the audit strip 380 is given a long feed between the total impressions made thereon.

The means for determining whether the link 431 or the link 432 will be coupled with the lever 427 comprises two pairs of control disks 440, 441, 442, and 443. The disk 440 is provided with a notch 444, and the disk 442 has a notch 445. These notches cooperate with noses 447 and 448, respectively, of feeler pawls 449 and 450, which also have noses 451 and 452 for cooperating with the disks 441 and 443, respectively. The pawl 449 is carried by a lever 543, pivotally mounted on a shaft 336, and is held by a spring 456 in contact with a stud 454 on an arm 455 secured to the shaft 336. A link 457 connects the lever 453 with the previously-described link 432. The shaft 336 is supported by the printer frames.

The pawl 450 is carried by a lever 460 held by a spring 462 in contact with a stud 461 on the opposite side of the arm 455. Connecting the lever 460 and the previously-described link 431 is a link 463. The lever 453 has a stud 464 normally contacting a stud 465 carried by the lever 460.

As stated above, the disks 440, 441, 442, and 443 (Figs. 1 and 3) are in the positions which they occupy prior to the beginning of an adding operation of the machine. During adding operations, these disks remain in such positions, and, when the shaft 336 is rocked counter-clockwise by cams 347 and 348 (Fig. 3) in a manner to be described hereinafter, the arm 455 is rocked likewise, whereupon the springs 462 and 456 rock the levers 460 and 453, respectively, counter-clockwise, due to the fact that the noses 447 and 448 at this particular time can enter the notches 444 and 445, respectively, of the disks 440 and 442.

The counter-clockwise moving of the levers 453 and 460, through their links 457 and 463, respectively, rocks the links 432 and 431 to engage the link 432 with the stud 430 and to disengage the link 431 from the stud 429 of the lever 427; therefore, when the cams 436 and 437 operate, the lever 427 is given a counter-clockwise movement and then a clockwise movement by the link 432, which movement, due to the fact that the stud 430 is farther away from the center of the shaft 428 than is the stud 429, is a shorter rocking movement than that given said lever 427 by the link 431, and consequently the lever 424 and the pawl 422 are moved a shorter distance, thus giving a short feed to the master tape or audit strip 380. Such short feed spacing is illustrated in Fig. 5.

The long feed spacing on the master tape is best illustrated in Fig. 4, where the strip is shown attached to a proof balance sheet 466, which is preprinted in the "Description" column, with the classification name. The long feed of the master tape or audit strip 380 causes the total of the various classifications to be printed, so that, when the strip is attached to the proof balance sheet 466, said totals will properly line up with their associated preprinted lines of the sheet. The studs 464 and 465 on the levers 453 and 460, respectively, are safety devices to always insure that the long feed link 431 is uncoupled from the lever 427 when the short feed link 432 is coupled to the lever 427. On the other hand, the stud 465, being underneath the stud 464, prevents the link 432 from being coupled with the lever 427 when the link 431 is coupled with the lever 427 for a long feed.

The means for rocking the shaft 336 in the manner previously mentioned is shown in Fig. 3 and comprises an arm 342 secured to the shaft 336, which arm is pivotally connected by a link 343 to a lever 344 loose on the shaft 304. This lever 344 carries rollers 345 and 346, which cooperate with plate cams 347 and 348, respectively, secured to the printer drive shaft 202. This shaft is, as above stated, rotated clockwise once during each adding operation and once during the second cycle of each total-taking operation, and, through the lever 344, the link 343, and the arm 342, the shaft 336 is rocked first counter-clockwise and then clockwise during each adding operation and during the second cycle of all total-taking operations.

In all total and sub-total operations which are controlled by the depression of any of the keys 80 to 85 inclusive (Fig. 7), it is necessary to prevent any counter-clockwise movement of the levers 453 and 460, and therefore it is necessary to rotate the disks 440 and 442 so that the notches 444 and 445 thereof will be out of the paths of movement of the noses 447 and 448 of the pawls 449 and 450. The means for moving these notches out of the paths of the noses 447 and 448 on said pawls 449 and 450 is controlled directly by the previously-mentioned total control plate 86 (Fig. 6). This mechanism will now be described.

Pivoted to the total control plate 86 (Fig. 6) in the usual manner is a link 470, which is connected to an arm 471 pivoted on the shaft 138. This shaft is supported by the machine frames, not shown in this divisional application. This arm 471 is connected to a gear segment 472 meshing with a gear segment 473 secured to a shaft 474. This shaft 474 has secured thereto a gear segment 475 meshing with a gear 476 fast on a shaft 477 supported by the printer frames. Also secured to the shaft 477 are two gears 478 (Figs. 1, 2, and 3), each of which meshes with a gear 479 and a gear 480. The gear 479 is secured to the notched disk 442, and the gear 480 is secured to the notched disk 440.

Whenever the total lever 86 is moved out of add position under control of any of the keys 80 to 85 inclusive, through the linkage and gearing just described, and illustrated in Fig. 6, the gears 478 (Figs. 1 to 3) are rotated to turn their associated disks 440 and 442 to remove the notches 444 and 445 out of the paths of the noses 447 and 448, so that, when the shaft 336 and the arm 455 are rocked counter-clockwise in the manner previously described, the noses 447 and 448 will contact true peripheries of the disks 440 and 442, thus preventing any counter-clockwise movement of the levers 460 and 453 and holding the links 431 and 432 in the positions shown in Figs. 1 and 3, whereby the master tape or audit strip 380 is given a long feed.

*Manual feed*

There is provided for the master tape or audit strip 380 a manual feed, so that, whenever necessary or desirable, the master tape can be fed out of the machine independently of the machine feeding mechanism. This manual feed comprises a hand-operated lever 490 (Fig. 1) fast to a shaft 491, to which is also secured an arm 492 having a projection 493 contacting a stud 494 in a lever 495 carrying a pawl 496 held in engagement with the ratchet 421 by a spring 497.

To feed the master tape 380 by hand, the operator moves the lever 490 counter-clockwise, which, through the arm 492, the lever 495, and the pawl 496, rotates the ratchet 421, and consequently the feed roll 390, counter-clockwise to manually feed the tape 380. Upon release of the lever 490 by the operator, a spring 498, connected to the lever 495, returns the parts to their normal positions. A stud 499 in an arm 500 fast on the previously-described shaft 412 acts as a stop for the arm 492 on its forward counter-clockwise movement, and, on the return movement clockwise of the arm 492 by the spring 498, a stud 501 on the arm 492 contacts the under side of a downward projection on the arm 500, which acts as a stop for the lever and the parts in this direction.

Should the operator desire to release the tension rolls 391 slightly and to not lock them in their raised positions by the depression of the arm 418 in the manner previously described, a slight clockwise movement of the lever 490 rocks the arm 492 clockwise until it is stopped by a stud 502 carried on the printer frame 64. This clockwise movement of the arm 492, through the stud 501, rocks the arm 500 and consequently the shaft 412 slightly in a counter-clockwise direction, whereupon the arms 414 (Fig. 9), through the studs 413, raise the tension rollers 391 from the feed rolls 390 just enough so that the master tape 380 may be drawn forward by hand without danger of tearing the paper due to the pressure of the tension rolls 391 on the feed rolls 390 when they are not separated.

A retaining pawl 503, held in engagement with the ratchet 421 by a spring 504, prevents any retrograde movement of the ratchet 421 and consequently of the feed roll 390 during all types of feed operations, whether by hand or whether made by the machine.

The master tape or audit strip 380 is fed out of the opening 505 (Fig. 1) in the cabinet 70, which covers the entire machine, a portion of which is shown in section in Fig. 1. It may not be desirable to allow this paper to hang free, and a hand-operated spool, such as that shown in the parent application, may be furnished and supported on the machine so that the free end of the strip 380 may be wound thereon by hand as it is fed out of the machine, if such is desirable. However, this hand-operated spool is not a part of the invention in this divisional application, and therefore it has not been thought necessary to show it in this case.

As the functions and operations of the feeding mechanism have been quite fully described throughout the specification, it is not felt necessary to give a description of the operation of the machine again.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine adapted to perform adding operations and total-taking operations; manipulative means to control the machine to perform adding operations; manipulative devices to control the machine to perform total-taking operations; record strip feeding means; feed actuating means adapted to be coupled to and uncoupled from the feeding means, said feed actuating means, when coupled to the feed means, being coupled in such relationship with the feed means as to feed the record strip one extent; a second feed actuating means adapted to be coupled to the feeding means when the first feed actuating means is uncoupled and adapted to be uncoupled from the feed means when the first feed actuating means is coupled to said feeding means, said second feed actuating means, when coupled to the feed means, being coupled in such relationship with the feed means as to feed the record strip an extent greater than the feed by the first-named feed actuating means; common operating means for both of said feed actuating means whereby the first-named and the second-named feed actuating means are operated the same extent; and means controlled by the manipulative means and the manipulative devices to couple the first feed actuating means with the feeding means when any of said manipulative means is operated and to couple the second feed actuating means with the feeding means when any of said manipulative devices is operated.

2. In a machine adapted to perform adding operations and total-taking operations, manipulative means to control the machine to perform adding operations; manipulative devices to control the machine to perform total-taking operations; record strip feeding means including a pivoted member having a first and a second connecting element located thereon at different distances from the pivot point of the member; feed actuating means adapted to be coupled to said first connecting element of the pivoted member to cause the feed means to feed the record strip one extent, said feed actuating means adapted to be uncoupled from said one connecting element; a second feed actuating means adapted to be coupled to said second connecting element of the pivoted member to cause the feed means to feed the record strip a greater extent than when the first actuating means is coupled to the first connecting element, said first actuating means being uncoupled from the first connecting element when the second actuating means is coupled to the second connecting member; a single set of cams comprising a common operating means for both of said feed actuating means; and means controlled by the manipulative means and the manipulative devices to couple the first feed actuating means with the feeding means when any of said manipulative means is operated and to couple the second feed actuating means with the feeding means when any of said manipulative devices is operated.

3. In a machine of the class described, the combination of feeding means for a record strip; an actuating means to feed the record strip one extent; another actuating means to feed the record material a greater extent; a common operating means for said actuating means; a plurality of manipulative means; control means settable differentially under control of the manipulative means; and sensing means coacting with the differentially settable control means, said sensing means connected to said two actuating means to selectively connect one or the other of said actuating means with the feeding means for feeding the record strip said one extent or said greater extent.

4. In a machine of the class described, the combination of feeding means for a record strip, one member of said feeding means being a pivoted member having two connecting points, one connecting point being nearer the pivot of the member than the other connecting point; an actuating means connectable to said other connecting point to actuate the feed means for feeding the record strip one extent; another actuating means connectable to said one connecting point to actuate the feed means a greater extent; a single set of cams to operate both actuating means; manipulative devices; control means settable under control of the manipulative devices; and means coacting with the control means and connected to the said two actuating means to selectively connect one or the other of said actuating means with the connecting points on the pivoted member to feed the record strip said one extent or said greater extent.

5. In a machine of the class described, the combination of feeding means for feeding a record strip, one member of the feeding means comprising a pivoted coupling member having two coupling points arranged thereon at different distances from the pivot point of the coupling member; an actuating means comprising a coupling element adapted to be connected to the coupling point the greatest distance from the pivot point of the coupling member to actuate the feeding means to feed the record strip one extent; another actuating means comprising a coupling element adapted to be connected to the coupling point nearest the pivot point of the coupling member to feed the record strip a greater extent; a common operator for both actuating means whereby both actuating means are actuated the same extent; and means to select which coupling element is to be effectively connected to the coupling member to feed the record strip said one extent or said greater extent.

6. In a machine of the class described, the combination of feeding means to feed record material, including a pivoted arm; two projections on the arm, one projection located nearer the pivot of the arm than the other projection; a first link connectable to the projection nearer the pivot of the arm to operate the feeding means a certain extent; a second link connectable to said other projection to operate the feeding means a lesser extent; a common operating means for moving the two links the same extent during every operation; and selecting means to select the link to be connected to its associated projection to determine the length of feed of the record material during an operation of the machine.

7. In a machine of the class described, the combination of feeding means for feeding a record strip, one member of the feeding means comprising a pivoted coupling member having two coupling points arranged thereon at different distances from the pivot point of the coupling member; an actuating means comprising a coupling element adapted to be connected to the coupling point the greatest distance from the pivot point of the coupling member to actuate the feeding means to feed the record strip one extent; another actuating means comprising a coupling element adapted to be connected to the coupling point nearest the pivot point of the coupling member to feed the record strip a greater extent; a common operator for both actuating means whereby both actuating means are actuated the same extent; means to select which coupling element is to be effectively connected to the coupling member to feed the record strip said one extent or said greater extent; and manipulative devices to control the selecting means.

PASCAL SPURLINO.
KONRAD RAUCH.